United States Patent
Thompson et al.

(10) Patent No.: US 10,207,553 B2
(45) Date of Patent: Feb. 19, 2019

(54) AMPHIBIOUS VEHICLE

(71) Applicant: SALAMANDER A.V. LIMITED, Belfast (GB)

(72) Inventors: Ian George Mervyn Thompson, Holywood (GB); Robert Flint McDowell, Walnut Shade (MO); Steven Barr, Belfast (GB); Andrew Colhoun, Belfast (GB)

(73) Assignee: Salamander A.V. Limited, Belfast (GB)

(*) Notice: Subject to any disclaimer, the term of this patent is extended or adjusted under 35 U.S.C. 154(b) by 0 days.

(21) Appl. No.: 15/519,093

(22) PCT Filed: Oct. 22, 2015

(86) PCT No.: PCT/GB2015/053162
§ 371 (c)(1),
(2) Date: Apr. 13, 2017

(87) PCT Pub. No.: WO2016/063064
PCT Pub. Date: Apr. 28, 2016

(65) Prior Publication Data
US 2017/0240013 A1    Aug. 24, 2017

(30) Foreign Application Priority Data

Oct. 22, 2014  (GB) .................................. 1418813.0

(51) Int. Cl.
*B60F 3/00* (2006.01)
*B63H 5/125* (2006.01)
*B63H 21/38* (2006.01)

(52) U.S. Cl.
CPC .......... *B60F 3/0038* (2013.01); *B60F 3/0007* (2013.01); *B60F 3/0053* (2013.01);
(Continued)

(58) Field of Classification Search
CPC .... B60F 3/0038; B60F 3/0007; B60F 3/0069; B63H 5/125; B63H 21/38
See application file for complete search history.

(56) References Cited

U.S. PATENT DOCUMENTS 3,385,255 A    5/1968  Raymond et al.
5,868,093 A    2/1999  Tseng
(Continued)

FOREIGN PATENT DOCUMENTS

CA    2413927 A1    7/2004
DE    1178732 B     9/1964
(Continued)

OTHER PUBLICATIONS

Search Report [Claims 1-46] (GB1418813.0), dated Mar. 20, 2015.
(Continued)

*Primary Examiner* — Stephen P Avila
(74) *Attorney, Agent, or Firm* — Gregory L. Porter; Hunton Andrews Kurth LLP

(57) ABSTRACT

An improved amphibious vehicle comprising: a drive train; a plurality of ground engaging wheels; a cooling system; a water propulsion system; and a hull which defines a passenger compartment, wherein the form/shape of the hull below the waterline is substantially defined by a plurality of buoyancy modules that are demountably mountable to the amphibious vehicle.

30 Claims, 15 Drawing Sheets

(52) U.S. Cl.
CPC ........... *B60F 3/0069* (2013.01); *B63H 5/125* (2013.01); *B63H 21/38* (2013.01); *B63H 2005/1254* (2013.01)

(56) References Cited

U.S. PATENT DOCUMENTS

| | | | |
|---|---|---|---|
| 6,029,598 A | 2/2000 | Stoll | |
| 6,315,622 B1* | 11/2001 | Wilson, Sr. | B60F 3/003 180/9.62 |
| 7,207,851 B1* | 4/2007 | Gibbs | B60F 3/0007 440/1 |
| 8,454,399 B1 | 6/2013 | Zelechonok | |
| 2002/0096101 A1* | 7/2002 | Hansen | B63B 7/082 114/345 |
| 2007/0113773 A1* | 5/2007 | Nakano | B63B 27/146 114/362 |
| 2013/0305977 A1* | 11/2013 | Dondurur | B60R 21/00 114/68 |

FOREIGN PATENT DOCUMENTS

| | | |
|---|---|---|
| DE | 102007028312 A1 | 12/2008 |
| EP | 0970824 A2 | 1/2000 |
| EP | 0974474 A2 | 1/2000 |
| EP | 2401164 B1 | 5/2013 |
| SU | 737253 A1 | 6/1977 |
| WO | 2000074960 A1 | 12/2000 |
| WO | 2003013884 A1 | 2/2003 |

OTHER PUBLICATIONS

Further Search Report [Claims 49-58] (GB1418813.0), dated Mar. 19, 2015.
Further Search Report [Claims 59-67] (GB1418813.0), dated Mar. 20, 2015.

\* cited by examiner

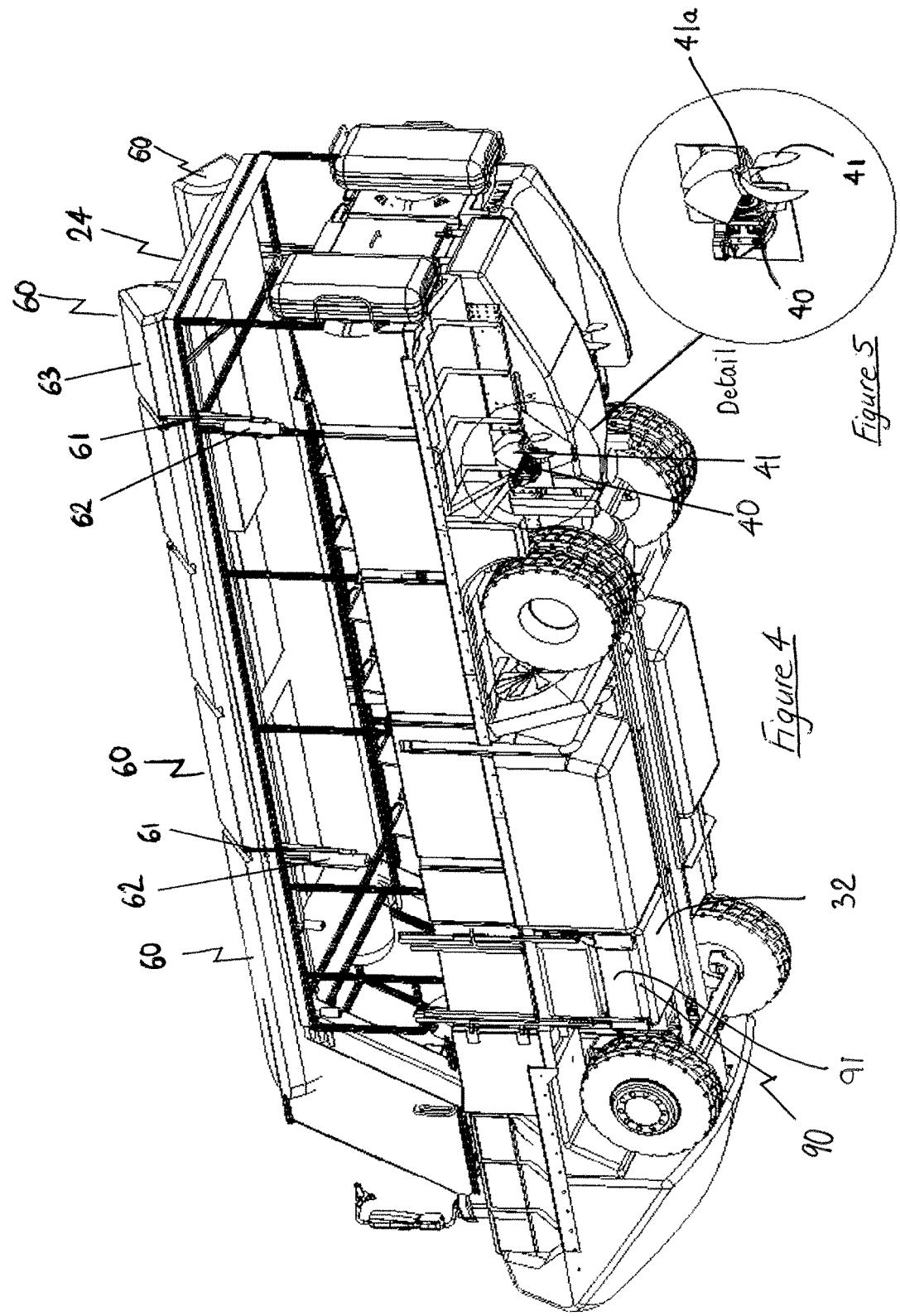

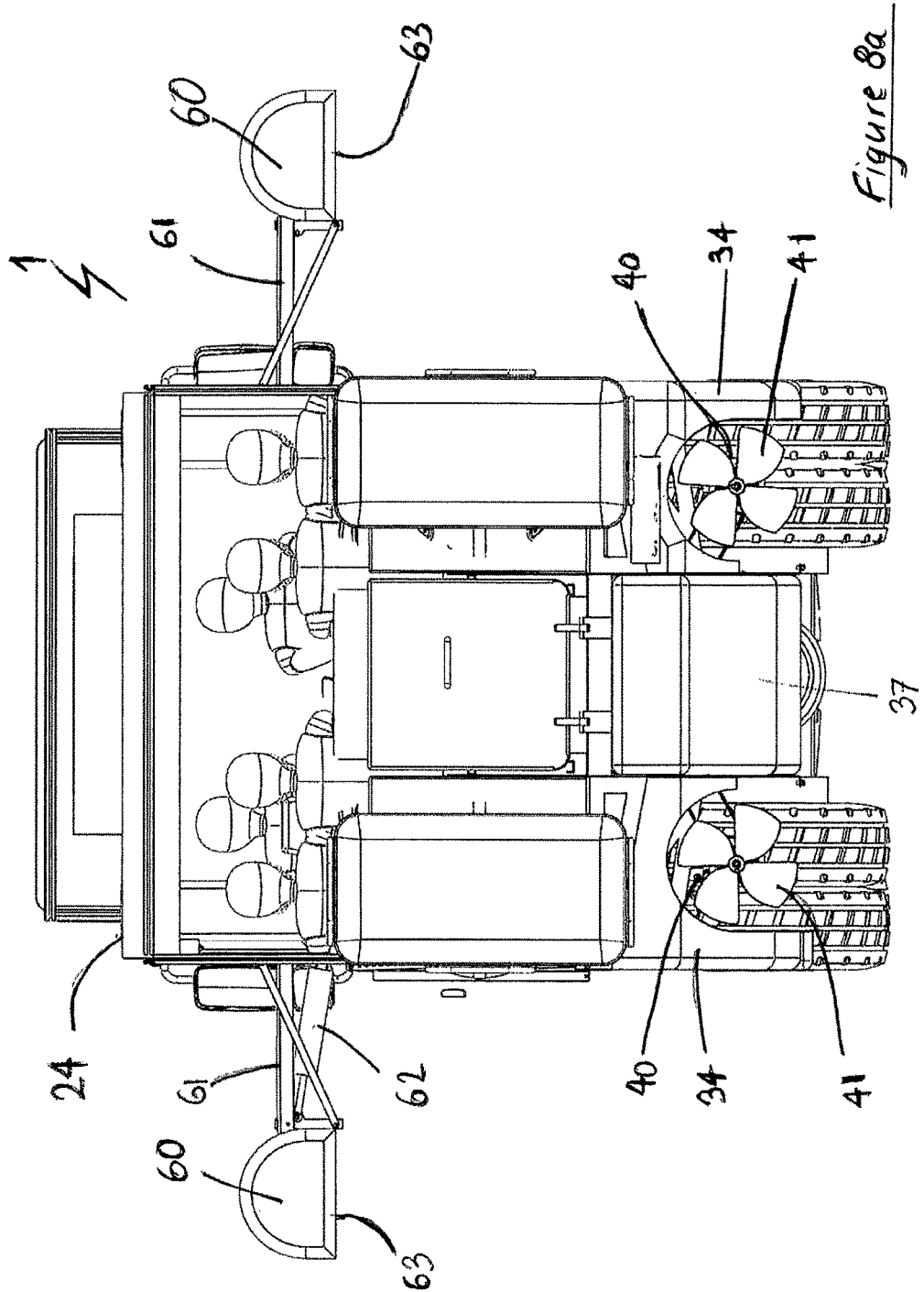

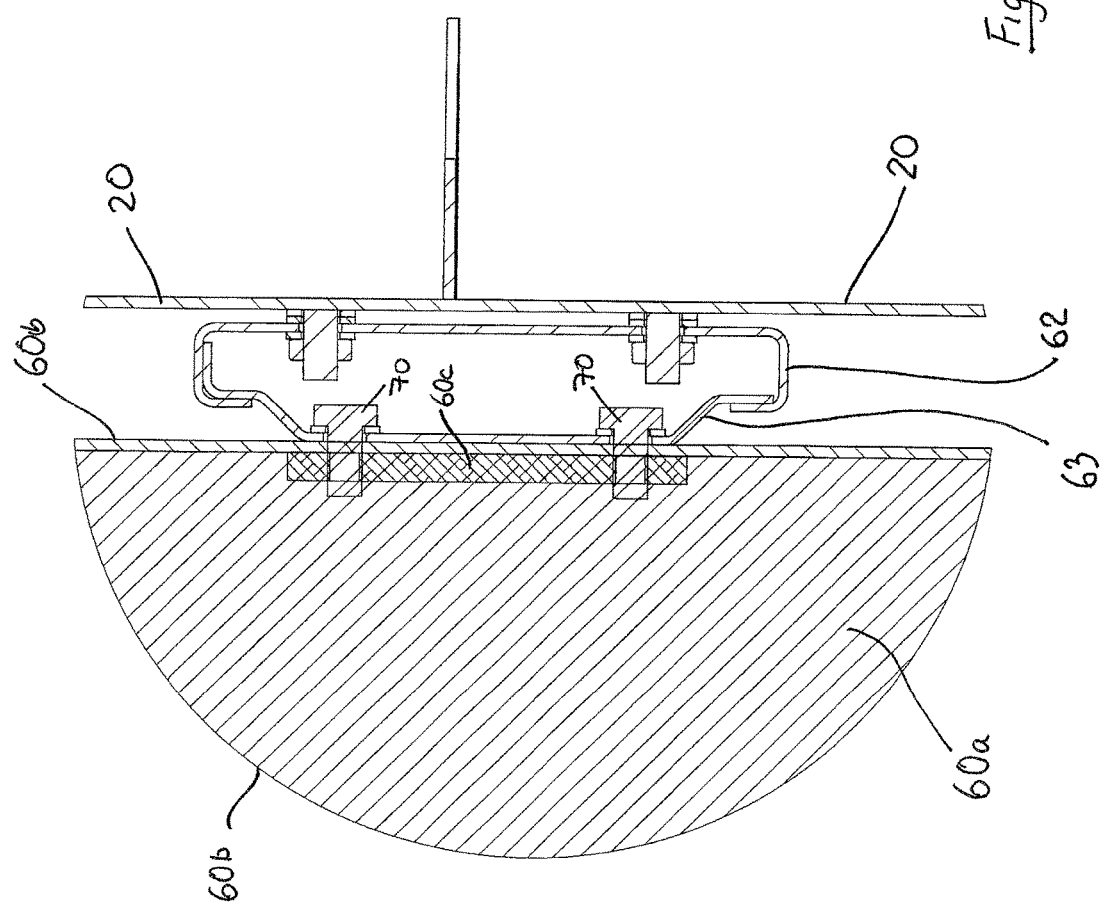

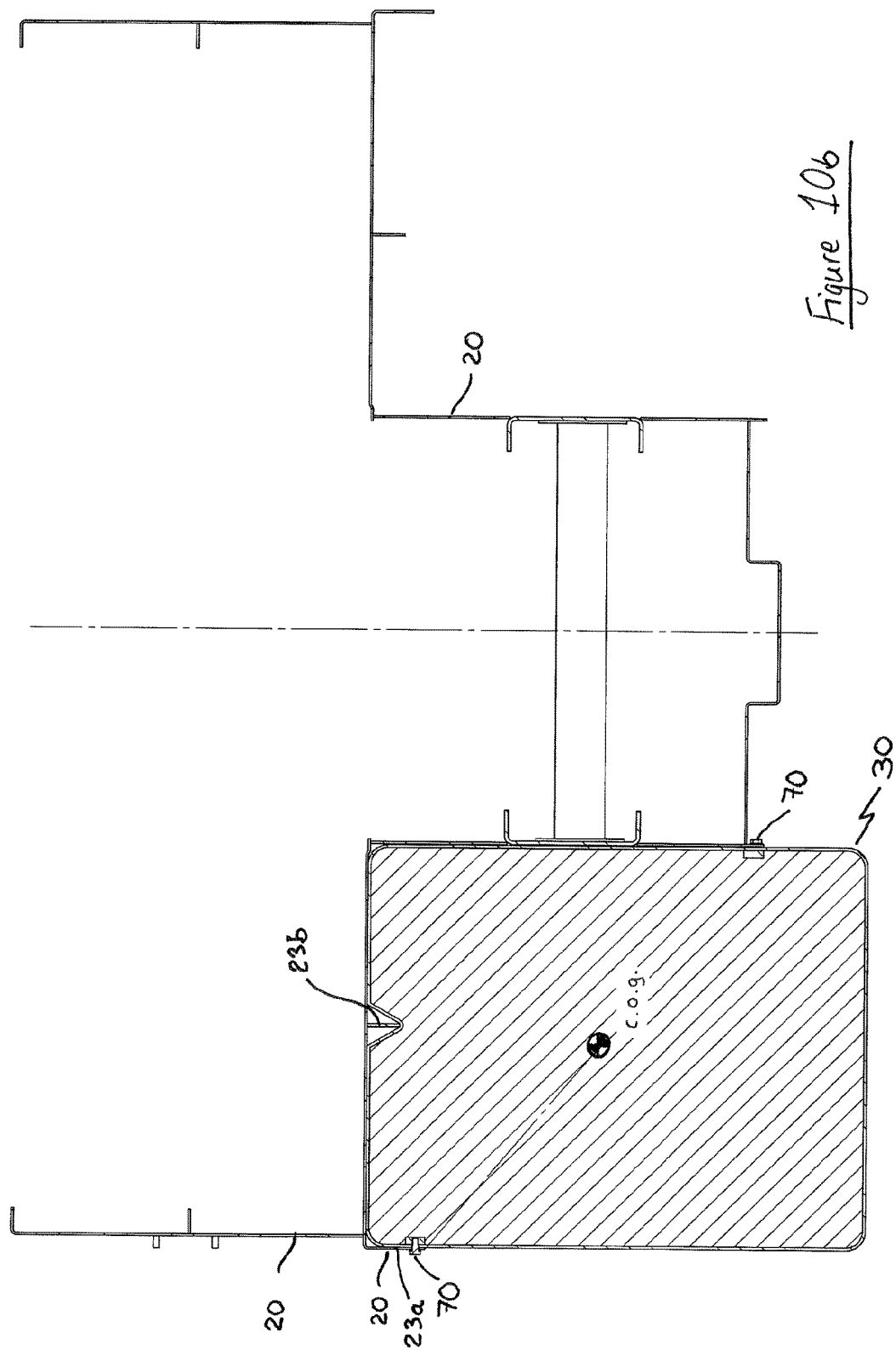

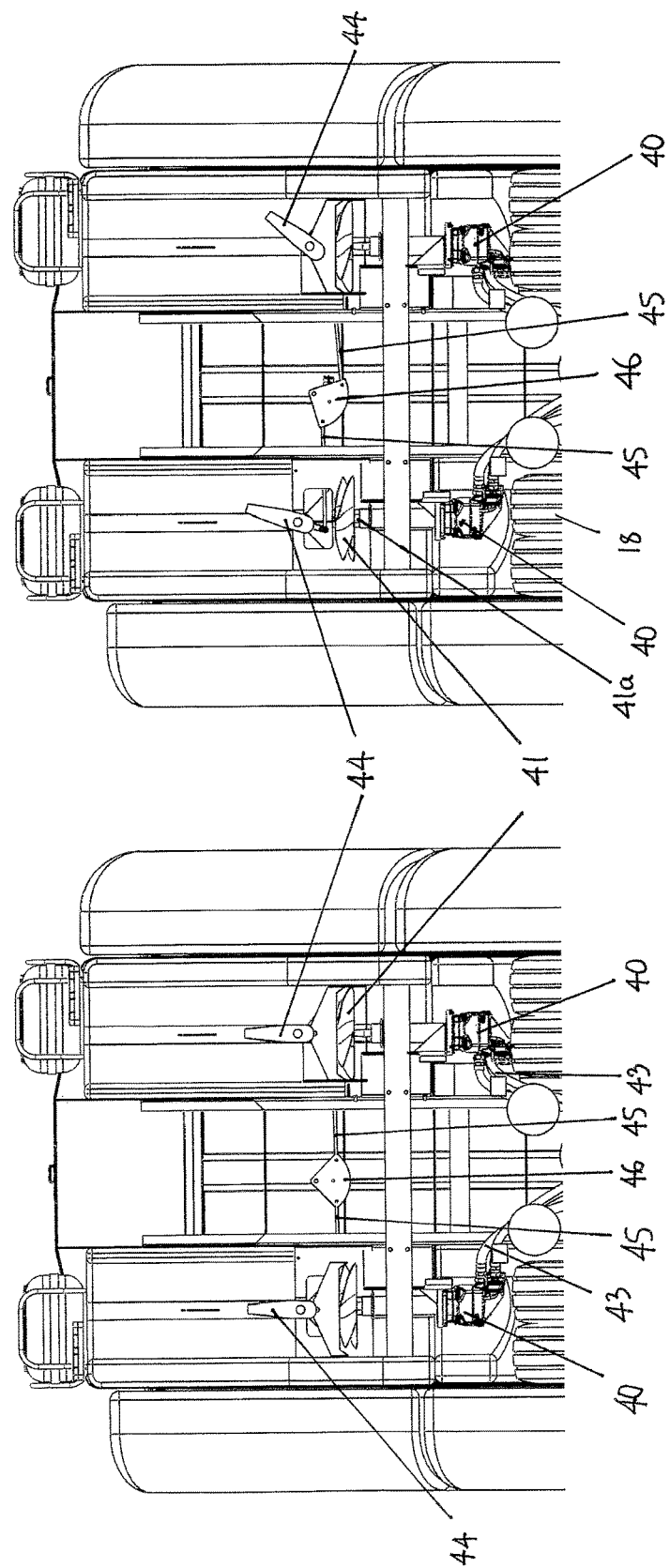

AMPHIBIOUS VEHICLE

The present invention relates to an amphibious vehicle and a propulsion and cooling system therefor, in particular to an improved amphibious vehicle particularly adapted for sightseeing services.

BACKGROUND OF THE INVENTION

Self propelled vehicles having ground engaging wheels and being capable of operation on both land and in water are well known in the art. Such vehicles are most often seen nowadays as sightseeing vehicles whereby vehicle passengers visit sights on land before the vehicle enters the water as part of the sightseeing experience. Many of these sightseeing amphibious vehicles are based on the original GMC DUKWs from the early 1940s. However these vehicles are becoming increasingly obsolete due to outdated technologies. While many operators continue their attempts to modify the original DUKW design, it is becoming increasingly difficult and uneconomical to do so while complying with the essential regulatory standards for operation. In particular, it has been a great challenge to upgrade the existing DUKW design to meet the United Kingdom regulations for buoyancy reserve (i.e. 110% buoyancy) without adversely impacting on the safe operation of the vehicle. Known methods to provide additional buoyancy reserve include spraying or installing foam into otherwise empty air containing voids or compartments within the hull of the vehicle. In practice these methods have proven to be deficient in a number of ways. For example in one case an attempt to meet buoyancy reserve regulations by packing foam into the hull of a DUKW was insufficient with the consequence of the vehicle sinking in an accident, and in other case the proximity of foam to moving parts caused overheating and fire.

It is therefore an object of the present invention to provide an improved amphibious vehicle.

SUMMARY OF THE INVENTION

An amphibious vehicle comprising:
a drive train;
a plurality of ground engaging wheels;
a cooling system;
a water propulsion system; and
a hull which defines a passenger compartment;
wherein the form/shape of the hull below the waterline is substantially defined by a plurality of buoyancy modules that are demountably mountable to the amphibious vehicle.

Preferably, the drivetrain comprises an engine and a gear box, the gear box being coupled to the ground engaging wheels by one or more drive shafts and/or axles.

It will be understood that the hull is a primary hull which serves the purpose of housing the passengers and drivetrain of the amphibious vehicle. While water will contact this primary hull when the vehicle is on the water, the form of hull form as defined by the buoyancy modules in use is the main water engaging surface which is externally visible below the vehicle's waterline.

In this way, the primary hull may be referred to as an inner hull, and in this way, the buoyancy modules may be considered as defining a secondary, or outer, hull.

In this way, the buoyancy modules in use add to the amphibious vehicle's wet surface area and increase the buoyancy reserve of the vehicle.

Conveniently, in this way, supplementary buoyancy of the amphibious vehicle is provided by buoyancy modules located externally of the hull of the amphibious vehicle, and substantially below the waterline of said hull of said amphibious vehicle.

Conveniently, the respective buoyancy modules are appropriately sized and shaped to define the necessary hull form/contours of the amphibious vehicle, for example, a front module (or modules) defines the bow of the vehicle, and a rear module (or modules) define the stern of the vehicle.

Conveniently, the amphibious vehicle further comprises stairs to enable passengers to enter and exit the passenger compartment. Advantageously, the steps of the stairs are formed as a buoyancy module. In this way, the stairs also contribute to the buoyancy of the amphibious vehicle.

Optionally, one or more rear modules are shaped having a profile which accommodates the propellers of the amphibious vehicle.

Preferably, the profile which accommodates the propellers of the amphibious vehicle comprises a duct profile.

Optionally, one or more buoyancy modules are adapted to define one or more wheel arches for one or more of the ground engaging wheels of the amphibious vehicle.

Conveniently, the buoyancy modules located on the amphibious vehicle in a manner such that they do not protrude outwardly beyond the side edges of the vehicle and therefore do not increase the effective width or 'beam' of the vehicle. In this way, regulations concerning the width of road going vehicles can be met. In other words, the widthwise footprint of the vehicle is not increased by the presence of the buoyancy modules.

In one embodiment, the hull is mounted upon a chassis. Optionally, the chassis comprises a pair of spaced apart beams to which the structure of the hull as well as the drivetrain, axles, suspension components and/or other necessary structural and bracing members are mounted. In this arrangement, the chassis is a rolling chassis to which the ground engaging wheels are mounted. Optionally, the chassis comprises the rolling chassis of a standard road going truck or lorry.

In an alternative embodiment, the chassis is integrally formed with the hull.

Preferably, the buoyancy modules are formed from a pliable closed cell foam.

Preferably, the buoyancy modules have an outer protective coating of substantially rigid material.

Preferably, the pliable closed cell foam is polyethylene foam.

Preferably still, the polyethylene foam is expanded polyethylene foam.

Preferably, the substantially rigid material comprises polyurea or polyethylene.

Preferably still, the substantially rigid material comprises polyurea or polyethylene foam.

Conveniently, the one or more buoyancy modules are fixed to the hull and/or vehicle chassis by releasable fixing means.

In a preferred arrangement, the fixing means comprises bolt fixing, wherein the shank of the bolt or bolts threadedly engages with a rigid member located within the or each buoyancy module.

Preferably, the rigid member located within the or each buoyancy module comprises a steel bar that is integrally formed with the or each buoyancy module.

Optionally, the steel bar is located within the or each buoyancy module beneath or behind the protective coating of substantially rigid material.

Optionally, the steel bar is fixed to the outer surface of the protective coating of substantially rigid material, for example by means of adhesive.

Alternatively, or additionally, fixing means may comprise strapping, rail mounting, or clamping.

Conveniently, connection of the one or more buoyancy modules to the amphibious vehicle is augmented by the buoyancy of said one or more buoyancy modules when the amphibious vehicle is in the water.

Preferably, the hull is of steel construction. However, it will be appreciated that the hull may construed from any suitable material, for example, but not limited to, aluminium, composites, polymers, or combination thereof.

Conveniently, the hull supports a roof of the amphibious vehicle, the roof being mounted to the hull via a plurality of pillars.

Optionally, the amphibious vehicle further comprises one or more deployable sponsons, the sponsons being located or stored proximate or on the roof when in a non-deployed configuration.

Preferably, the sponsons have substantially the same construction and materials as the buoyancy modules.

In one embodiment, the or each sponson is/are manually mountable in their deployed configuration to sponson mounting means provided on the sides of the amphibious vehicle.

Optionally, the sponson mounting means comprises one or more rails onto which the sponsons are releasably engagable.

Optionally, the or each sponson is/are slidaly engageable with the one or more rails.

Optionally, the or each sponson is/are maintained on the one or more rails by means of bolts or latches.

In an alternative embodiment, the sponsons are automatically deployable and retractable sponsons, being movable in a deployed configuration to locations adjacent the respective sides of the amphibious vehicle.

Optionally, each automatically deployable sponson is pivotally mounted to the hull of the amphibious vehicle by one or more arm members.

Optionally, each automatically deployable sponson is movable by means of one or more rams, the or each ram being operable on an arm member to which a sponson is attached.

Conveniently, the rams may be hydraulic, pneumatic or electrically powered rams.

Optionally, each automatically deployable sponson comprises a substantially planar surface adapted to abut against a side surface of the amphibious vehicle when in a deployed configuration.

Optionally the water propulsion system comprises dual hydraulically powered pods, each pod comprising a hydraulic motor that is coupled to a propeller, wherein hydraulic power is provided to each hydraulic motor by one or more engine driven hydraulic pumps.

Preferably, the hydraulic pumps are located proximate the engine of the amphibious vehicle.

Conveniently, the hydraulically powered pods are located externally of the hull.

Preferably, each hydraulically powered pod and/or propeller is located in use proximate to or within the ducts defined by the rear buoyancy modules of the amphibious vehicle.

Preferably, each pod is powered by a dedicated hydraulic pump.

Preferably, the hydraulic pumps are located ahead of the engine at a position between the engine and the bow of the amphibious vehicle in use. In this way, the noise of the hydraulic system experienced by the amphibious vehicle's passengers is mitigated.

Conveniently, the hydraulic pods are in hydraulic communication with the or each respective hydraulic pump via hydraulic lines.

Optionally, the hydraulic lines are located substantially externally of the hull of the amphibious vehicle.

In this way, the heat from the hydraulic lines is kept external to the hull, and the lines are cooled by the water when the vehicle in the water.

Conveniently, the hydraulic lines may comprise flexible or rigid hydraulic pipes.

Advantageously, the use of hydraulic pods and hydraulic lines obviates the need for mechanical linkage between the engine of the amphibious vehicle and the propellers. In this way, the requirement for a drive shaft and associated carrier bearings is obviated thereby saving weight and space. Furthermore, the danger of a spinning drive shaft penetrating the hull is obviated.

Optionally, each hydraulic pod is mountable to the amphibious vehicle to be independently adjustable in pitch and yaw. In this way, the propeller shaft angle can be optimised. In this way also, the alignment of the respective hydraulic pods can be adjusted to optimise the speed of the amphibious vehicle while in the water and/or influence the turning characteristics to minimise rolling to the outside of a hard turn. Alternatively, each hydraulic pod can be arranged at a fixed orientation.

Optionally, each hydraulic pod is independently operable with variable and reversible rpm.

Conveniently, independent operability enables isolation of one pod from the other in the event of a failure thereby enabling the amphibious vehicle to return to shore or mooring in a 'limp mode'.

In one embodiment, primary steering control of the amphibious vehicle when in the water is effected by rudders located downstream of the respective hydraulic pods, and preferably located within the ducts defined by the rear buoyancy modules. In this embodiment, the hydraulic pods are set at a fixed orientation.

Optionally, the respective rudders are linked together via rods which connect to a link plate. In this way, steering input through the link plate deflects rods such that the rudder occupying the inside of a turn rotates through a greater angle than the rudder occupying the outside of the turn. Advantageously, this arrangement obviates the problem of choking of the water flow through the duct at the outside of the turn, which would otherwise cause the loss of vehicle turning power created by the ensuing off-centre thrust.

In an alternative embodiment, primary steering control is provided by adjusting the pitch and yaw of the respective hydraulic pods. In this way, the propeller shaft angle can be optimised. In this way, the requirement for rudders and associated control system is obviated. An emergency rudder would therefore only be required in the event of loss of propulsion of one pod. In this way also, the alignment of the respective hydraulic pods can be adjusted to optimise the speed of the amphibious vehicle while in the water and/or influence the turning characteristics to minimise rolling to the outside of a hard turn.

Advantageously, the hydraulic pods are spaced apart. In this way, and in conjunction with the independently operable nature of the respective hydraulic pods, steering control of the amphibious vehicle when in the water is improved. Furthermore, such an individually controllable dual hydraulic propulsion system allows the amphibious vehicle to turn substantially within its own length thereby dramatically improving manoeuvrability. This is especially important when performing a timely man overboard drill and is essential when operating in tight quarters and/or windy conditions.

In addition, steering is particularly optimised in reverse motion thereby negating the need for a bow thruster during low speed and space restricted operation.

Advantageously, each hydraulic pod is located aft of a respective rear wheel at position that is substantially level with the said wheel.

Furthermore, having two propellers, each having a smaller diameter means that the top of each propeller can be deeper in the water with respect to the single propeller that is found in traditional DUKW based amphibious vehicles. In this way, the respective propellers are located lower in the water in use than traditional DUKW-based amphibious vehicles. In this way, cavitation and/or aeration at the propellers due to air ingestion is minimised thereby greatly improving forward and reverse thrust.

In addition, operation of two propellers deeper in the water provides improved reverse propulsion.

Conveniently the cooling system comprises one or more radiators in fluid communication with the engine, and wherein the one or more radiators are located externally of the hull of the amphibious vehicle.

In this way, the one or more radiators are substantially immersible in the water when the amphibious vehicle is in the water. In this way the radiator(s) is/are water cooled when the amphibious vehicle is in the water, and is/are air cooled when the amphibious vehicle is on land.

Preferably, the one or more radiators are located within the rear wheel wells of the amphibious vehicle.

Preferably, there are provided two radiators, each radiator being located in a respective rear wheel well of the amphibious vehicle.

Conveniently, the radiators are arranged in parallel (i.e. not sequential) configuration.

Optionally, the cooling system comprises a means to regulate the temperature of the cooled cooling fluid (i.e. coolant) returning to the engine of the amphibious vehicle.

Conveniently, the means to regulate the temperature of the cooled coolant returning to the engine of the amphibious vehicle comprises cooling circuit having a thermal mixing valve to adjust the temperature of the cooled coolant, the thermal mixing valve having an input from the cooled coolant from the radiators, and an input from the engine, wherein the cooled coolant returning to the engine is mixed with a portion of the engine heated coolant. In this way, the temperature of the coolant returning to the engine is regulated so as not to be too hot to cause engine overheating, and not too cold to cause the engine to run inefficiently and not meet emissions regulations.

Preferably, the or each radiator comprises a fan.

Optionally, the or each fan is hydraulically powered. Optionally, hydraulic power is provided by the same hydraulic pumps that power the water propulsion system of the amphibious vehicle.

Alternatively, the or each fan is electrically powered.

Alternatively, the or each fan is mechanically driven.

Conveniently, the or each fan is fully submersible.

Advantageously, the fans are controllable to be non operable when the amphibious vehicle is in the water. In this way, all available power produced by the engine can be directed to the water propulsion system.

Conveniently, the location of the one or more radiators within the rear wheel wells of the amphibious vehicle, i.e. spaced apart from the engine, means that when on land the ambient air which cools the radiators will not be preheated by passing over the engine, exhaust, turbo, transmission of the vehicle. In this way, the cooling efficiency of the radiator is increased. In addition, the heat dissipation along the increased length of the piping between the engine and radiator assists in cooling the engine coolant, particularly where the piping runs external to the hull.

Advantageously also, heat dissipated by the radiator(s) is prevented from recirculating the amphibious vehicle's passenger compartment. This is because the radiators are located towards the rear of the vehicle and heat from the radiators can immediately be dissipated rearwardly from the vehicle.

Similarly, the location of the radiators within the wheel wells helps alleviate noise transmission from the fans to the passengers.

Further advantageously, the external location of the radiators enables improved access for service, repair and replacement, and frees up space that would otherwise be taken up within the hull in the form of ventilation corridors. By obviating the need for such ventilation corridors within the hull, the space saved can be used for at addition of further buoyancy material within the amphibious vehicle.

The various embodiments of the present invention can be practiced alone or in combination with one or more of the other embodiments, as will be appreciated by those skilled in the relevant arts. The various embodiments of the invention can optionally be provided in combination with one or more of the optional features of the other embodiments of the invention. Also, optional features described in relation to one example or embodiment can optionally be combined alone or together with other features in different examples or embodiments of the invention.

Various examples of the invention will now be described in detail with reference to the accompanying figures. Other aspects, features, and advantages of the present invention are readily apparent from the entire description thereof, including the figures, which illustrate a number of exemplary implementations. The invention is also capable of other and different aspects and implementations, and its several details can be modified in various respects, all without departing from the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa.

All singular forms of elements, or any other components described herein are understood to include plural forms thereof and vice versa.

DETAILED DESCRIPTION OF THE INVENTION

Embodiments of the present invention will now be described, by way of example only, with reference to the accompanying drawings in which:

FIG. 4 is a schematic illustration showing an engine cooling system and water propulsion system in accordance with the invention;

FIG. 5 is a detailed view of the water propulsion system shown in FIG. 4;

FIGS. 8a and 8b are schematic end elevations of an amphibious vehicle in accordance with the invention showing automatically deployable sponsons in raised and lowered configurations, respectively;

FIG. 9c is a detailed cross-sectional illustration showing in detail the mounting of a manually deployable sponson to an amphibious vehicle;

FIGS. 10a and 10b are schematic cross-sectional illustrations showing the connection of a buoyancy module to the hull of an amphibious vehicle;

FIGS. 12a and 12b are schematic illustrations showing a rudder steering arrangement of an amphibious vehicle in accordance with the invention.

Figure 1:
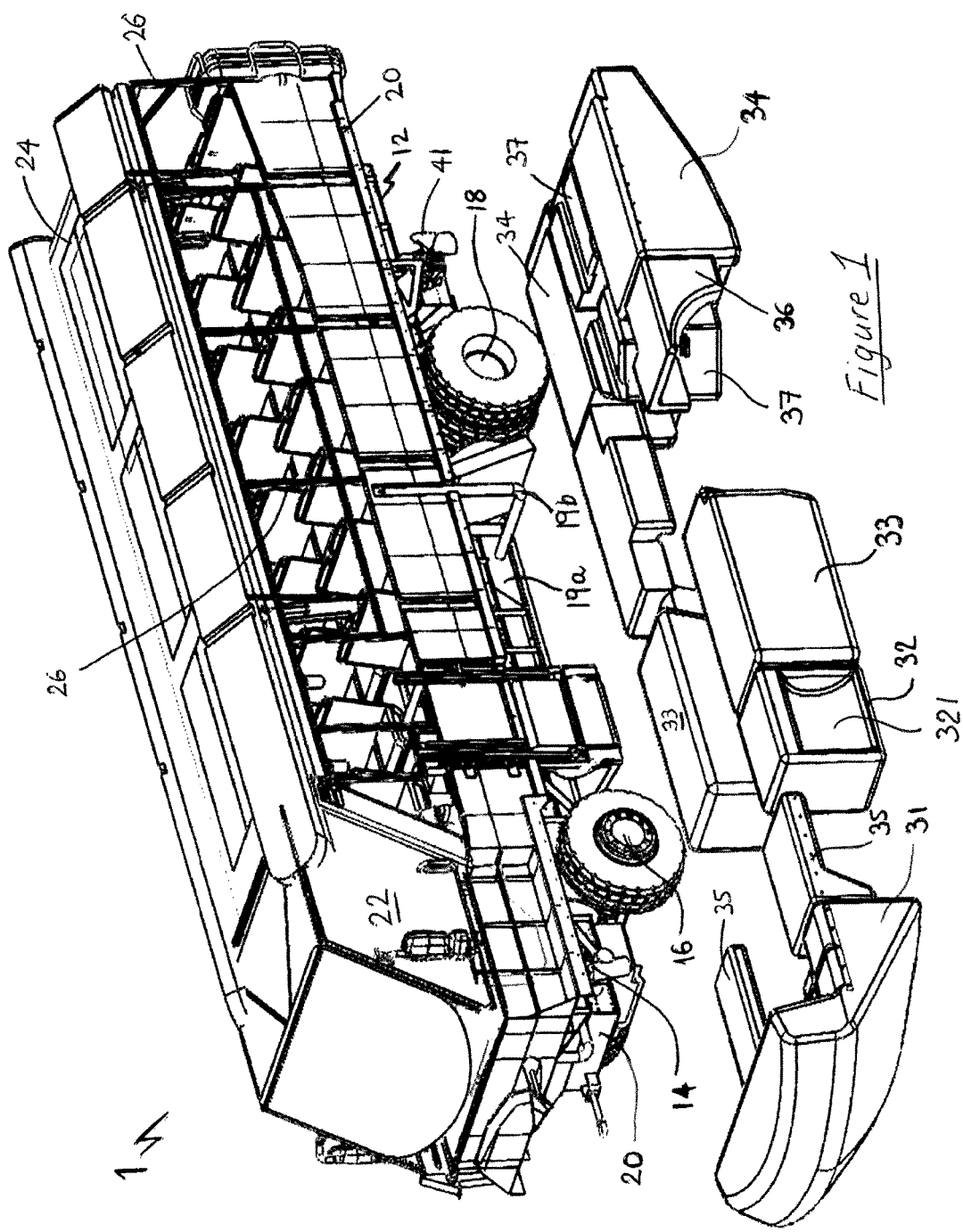
FIG. 1 is a schematic perspective illustration of an exemplary amphibious vehicle in accordance with the invention and showing exemplary buoyancy modules separated from the vehicle.
Figure 2:
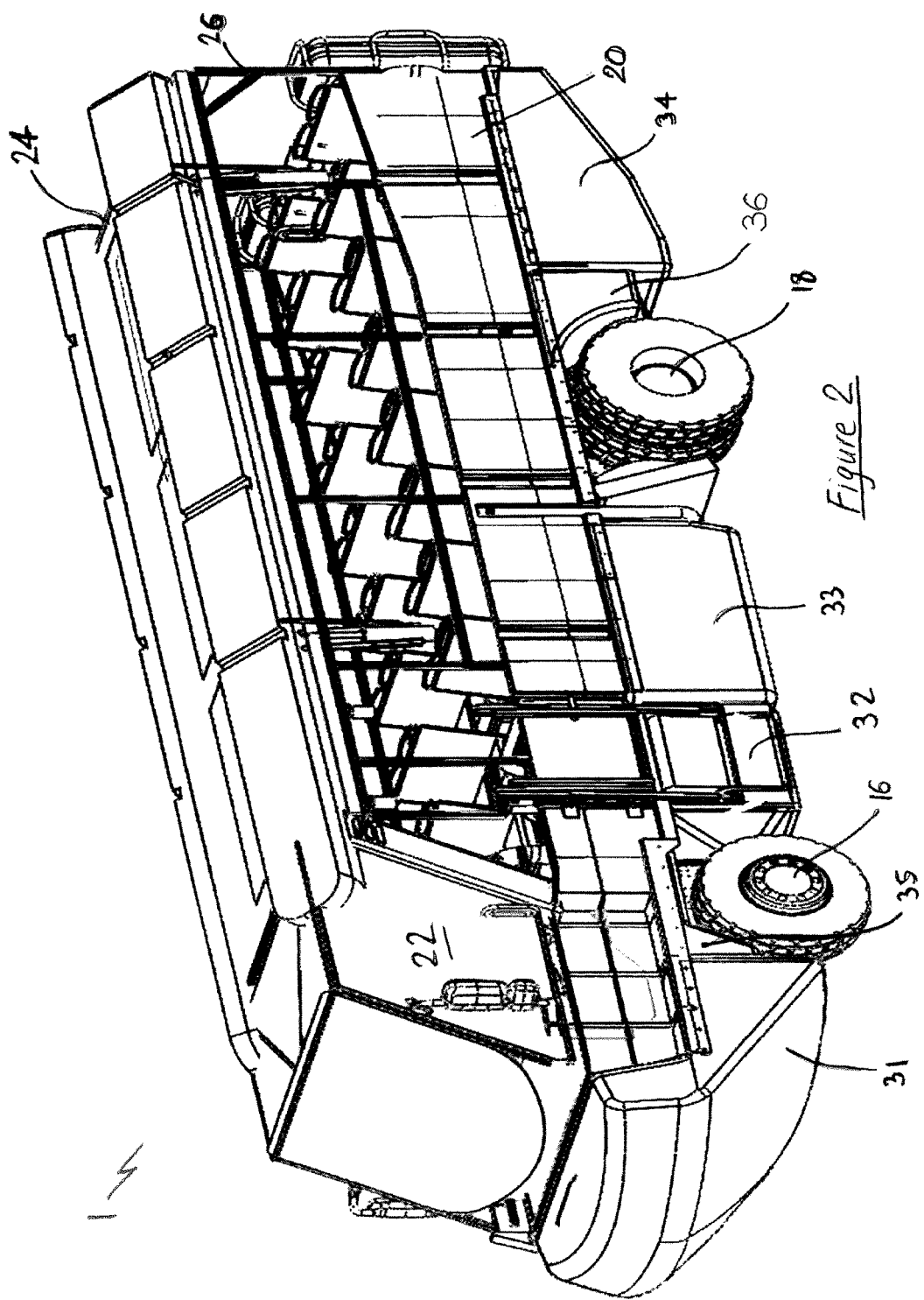
FIG. 2 is a schematic perspective illustration of the amphibious vehicle of FIG. 1 showing exemplary buoyancy modules mounted to the vehicle.
Figure 3:
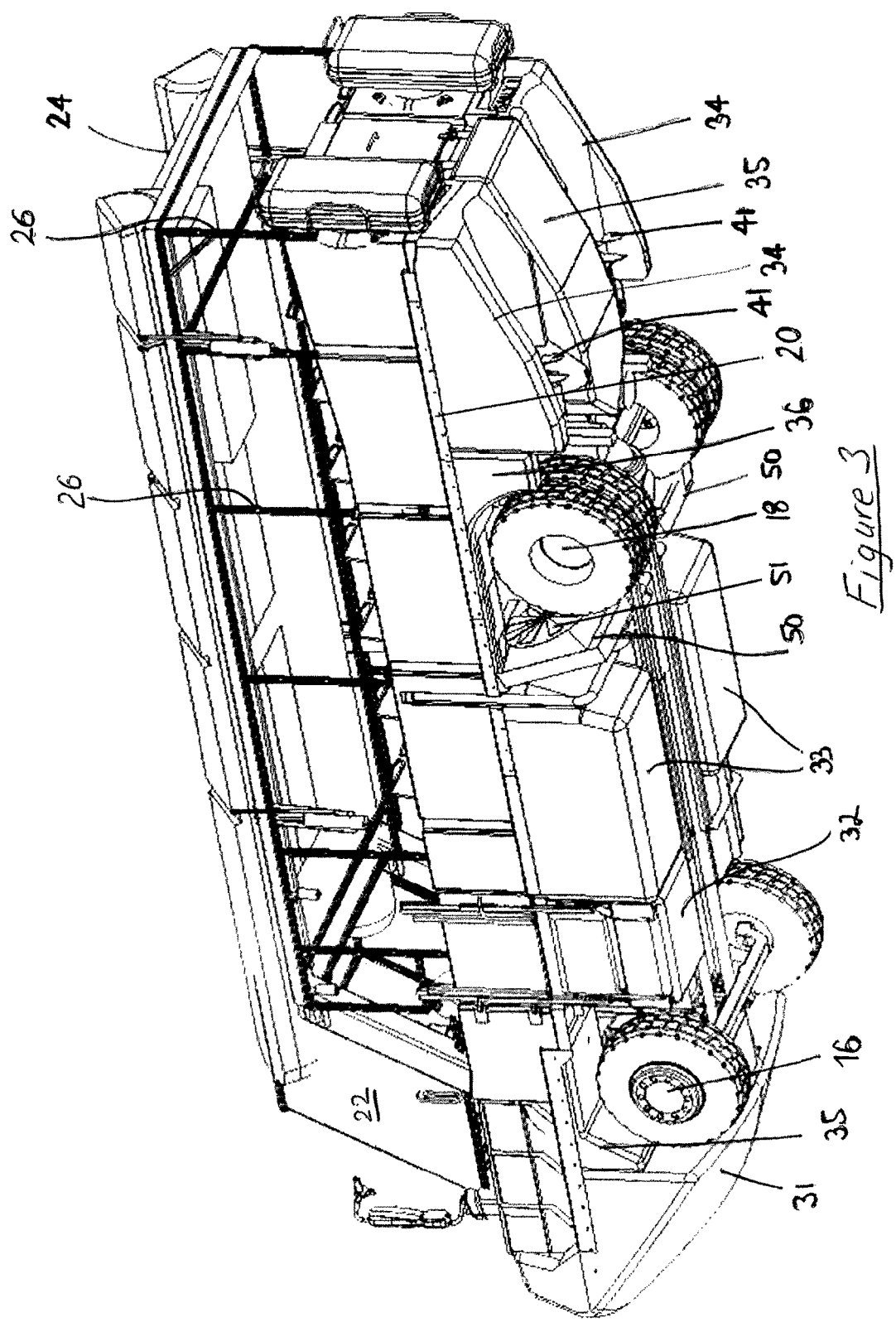
FIG. 3 is a schematic perspective illustration showing the underside and rear of the amphibious vehicle of FIG. 1 and in which the engine cooling system and water propulsion system is visible.

Referring initially to FIGS. 1 to 3, there is shown an embodiments of an amphibious vehicle 1 comprising: a chassis 12 (FIG. 1); an engine 14 (FIG. 1); ground engaging driven wheels 16, 18; a water propulsion system; a cooling system; an inner hull 20 which defines a passenger compartment having seating for passengers and which supports a driver's cab 22; and an outer hull the form/shape of which is substantially defined by a plurality of buoyancy modules 31, 32, 33, 34, 35, 36, 37 that are demountably mountable to the inner hull amphibious vehicle. Inner hull 20 further supports a roof 24 of the amphibious vehicle that is mounted to the hull via a plurality of pillars 26.

Figure 6:
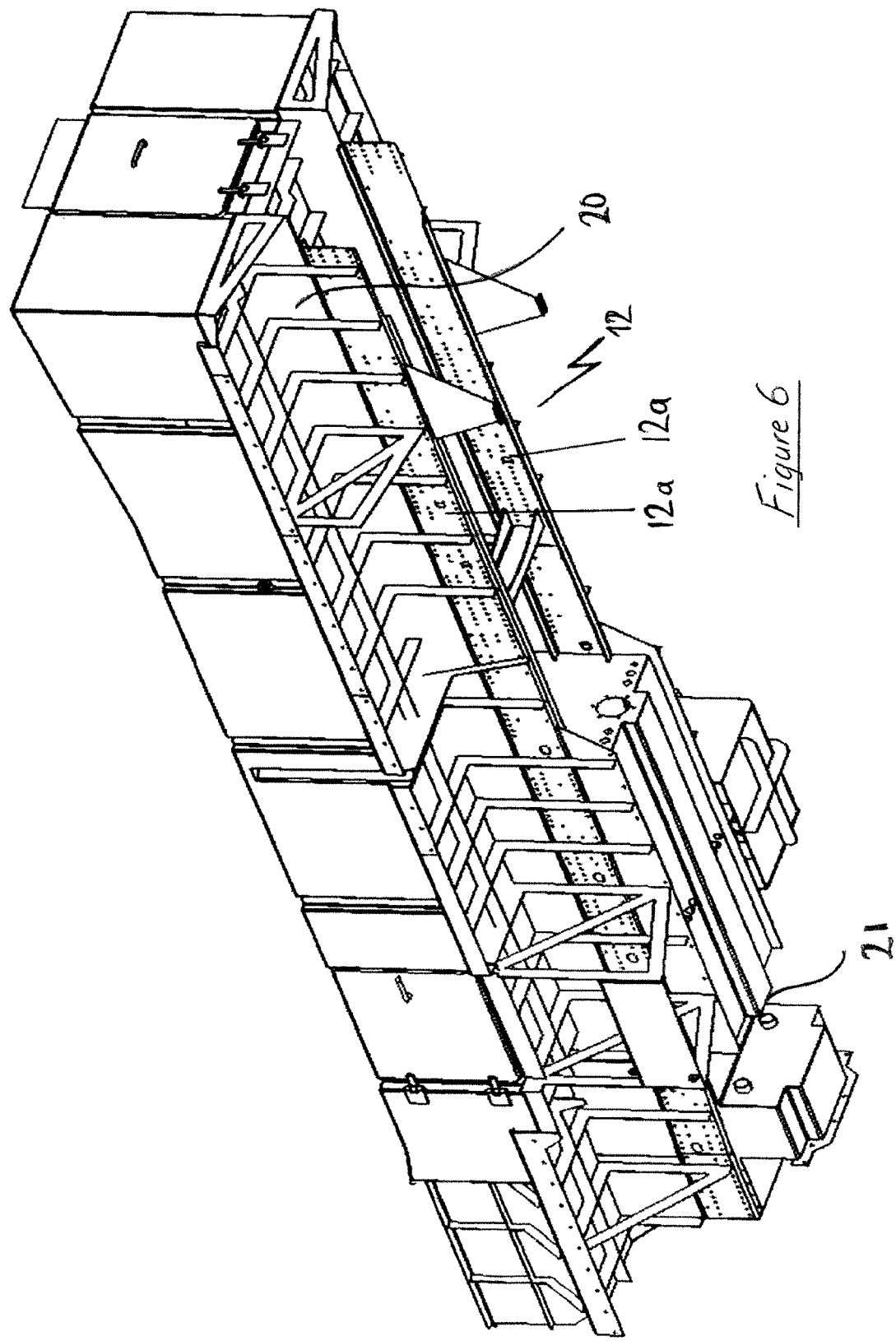
FIGS. 6 and 7 are schematic perspective illustrations of a hull of the amphibious vehicle in accordance with the invention, without and with road engaging wheels, respectively.
Figure 7:
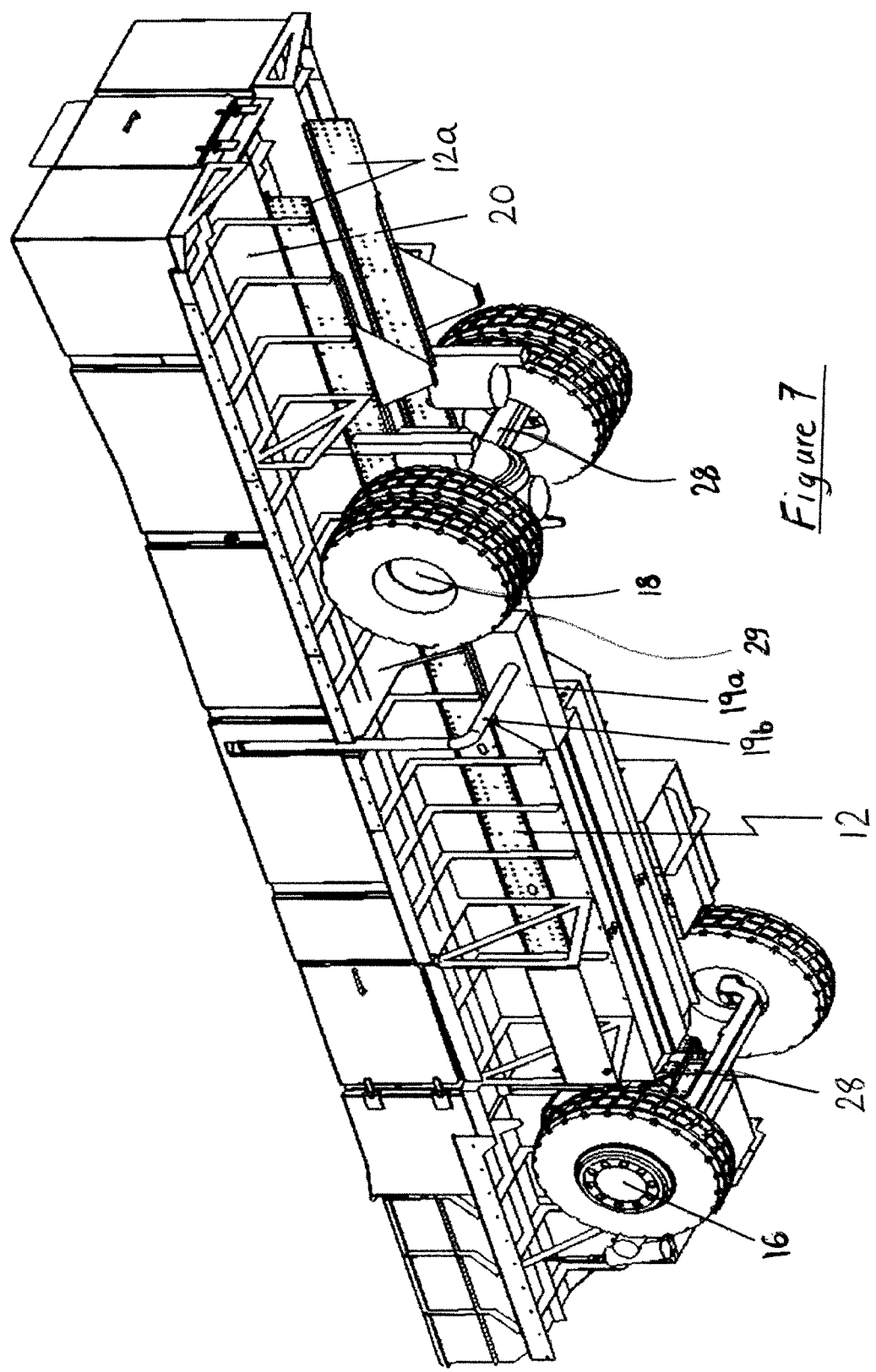

Detail of the chassis 12 and inner hull 20 are shown in FIGS. 6 and 7. In FIG. 7, a fuel tank 19a and fuel filler neck 19b of the amphibious vehicle are shown, the tank 19a being located on the underside of the vehicle and generally central between the respective sides of the vehicle.

In the embodiment shown in the Figures, the inner hull is mounted upon the chassis. Chassis 12 comprises a pair of spaced apart beams to which the structure of the inner hull 20 as well as the engine (not visible), axles 28 (FIG. 6), suspension components (not shown) and other structural and bracing members are mounted. In this way the chassis 12 may comprise the rolling chassis of a standard road going truck or lorry. As indicated in FIGS. 6 and 7, the engine, gear box and associated ancillaries of the amphibious vehicle are housed within a compartment 21 that forms part of the inner hull 20. In this way, the engine, gear box and associated ancillaries are shielded from the water. Drive to the rear wheels 18 of the vehicle is via a drive shaft 29 (FIG. 7) that extends from compartment 21 to said driven wheels 18. The front wheels 16 may also be driven wheels. Generally, in normal use, compartment 21 extends below the waterline of the vehicle while the passenger compartment remains substantially above the waterline.

In an alternative embodiment (not shown), the inner hull structure itself defines or incorporates chassis members to which the drivetrain, axles, suspension components and/or other structural and bracing members are mountable. In this alternative arrangement, the inner hull directly supports the drivetrain, axles, suspension components and/or other necessary structural and bracing members of the amphibious vehicle.

As described previously, the form/shape of the outer hull is substantially defined by buoyancy modules 31, 32, 33, 34, 35, 36, 37 which are demountably mountable to the amphibious vehicle.

Thus it will be appreciated that the inner hull is a primary hull which serves the purpose of housing the passengers and drivetrain of the amphibious vehicle. While water will contact this primary hull when the vehicle is on the water, the form of the outer hull as defined by the buoyancy modules in use is the main water engaging surface which is externally visible below the vehicle's waterline.

In this way, the primary hull may be referred to or considered as an inner hull, and in this way, the buoyancy modules may be considered as defining/providing a secondary, or outer, hull.

Through placement of the buoyancy modules 31, 32, 33, 34, 35, 36, 37 externally of the inner hull, said buoyancy modules add to the amphibious vehicle's wet surface area and increase the buoyancy reserve of the vehicle.

As shown in FIGS. 1 and 2, the respective buoyancy modules are be appropriately sized and shaped to define the necessary hull shape or 'form' of the amphibious vehicle 1, with suitable spacing to accommodate the wheels 16, 18 of the vehicle. For example, a suitably shaped front module 31 (or modules if formed from a number of separate modules) defines the bow of the vehicle. The front module may include the headlights 80 of the amphibious vehicle as shown in FIG. 9a. Modules 35 define front wheel arches and modules 36 define rear wheel arches. Rear modules 34, 37 define the stern of the vehicle. As shown in FIGS. 3 and 8a, rear modules 34 are shaped having a profile which defines a duct which accommodates the propellers 41 of the water propulsion system of the amphibious vehicle. Module 37 is a centre stern piece. Rear modules 34 may comprise additional reinforcement to help the module withstand the forces created by water propulsion within the ducts defined by said modules. Such reinforcement may comprise a band 81 of rigid material such as steel that is placed upon or formed within said module around or proximate the duct form as shown schematically in FIG. 9a With reference to FIG. 10 in which an exemplary buoyancy module 30 is shown, buoyancy modules 31, 32, 33, 34, 35, 36, 37 are formed from a pliable closed cell foam 30a, preferably expanded polyethylene foam, having an outer protective coating 30b of substantially rigid polyurea or polyethylene which encases said closed cell foam. In this way, the protective coating directly protects the pliable closed cell foam from impact damage.

The respective buoyancy modules are fixed to the exterior of the inner hull 20 and/or vehicle chassis 12 by any suitable fixing means. Such fixing means may comprise, but is not limited to, one or more of bolting, strapping, rail mounting, or clamping.

The amphibious vehicle also comprises access stairs 90 to enable passengers to enter and exit the passenger compartment. The stairs are shown in a raised configuration in FIG. 4, and shown in a lowered configuration in FIG. 9a. Conveniently, the steps 91 of the stairs are formed as a buoyancy module having a structure substantially as described above and which are adapted to nest within a space 321 (FIG. 1) defined within buoyancy module 32 when raised. In this way, the stairs also contribute to the buoyancy of the amphibious vehicle.

Figure 10A:
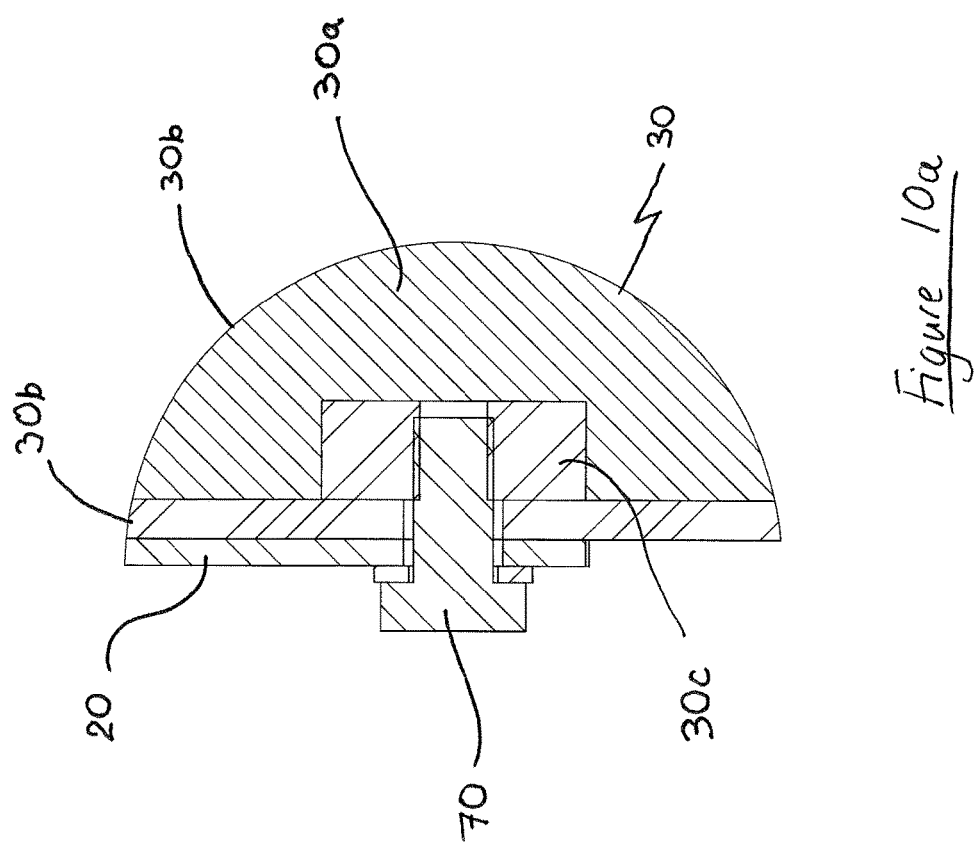

In a preferred arrangement as shown in FIGS. 10a and 10b, the shank of bolt or bolts 70 is extended through an aperture in the inner hull or chassis of the amphibious vehicle and screw threadedly engages with a rigid member located within the buoyancy module.

The rigid member located within the buoyancy module preferably comprises a steel bar or member 30c that is integrally formed with the buoyancy module. The steel bar or member 30c is located within the buoyancy module beneath or behind the protective coating of substantially rigid material 30b. Optionally, the steel bar could be fixed to the outer surface of the protective coating 30b, for example by means of a suitable adhesive.

With reference to FIG. 10b, it can be seen that the fitment buoyancy module to the amphibious vehicle can be augmented by means of formations such as lips 23a, webs 23b or protrusions on the inner or primary hull 20 or chassis 12 which engage with the buoyancy module or complementary formations provided thereon. In this way, although the buoyancy modules are primarily mechanically fixed to the amphibious vehicle in use, the buoyancy of said modules coupled with the form of the inner hull where the modules are located augments this attachment in a secondary manner when the vehicle is in the water under all foreseeable angles of heel and trim. For example, in FIG. 10b, the angle of heel of the amphibious vehicle while in the water would have to equal or exceed 50.1 degrees before the buoyancy module 30 naturally tended to move apart from the inner hull 20 and act the against the securing force of bolts 70.

Figure 8B:
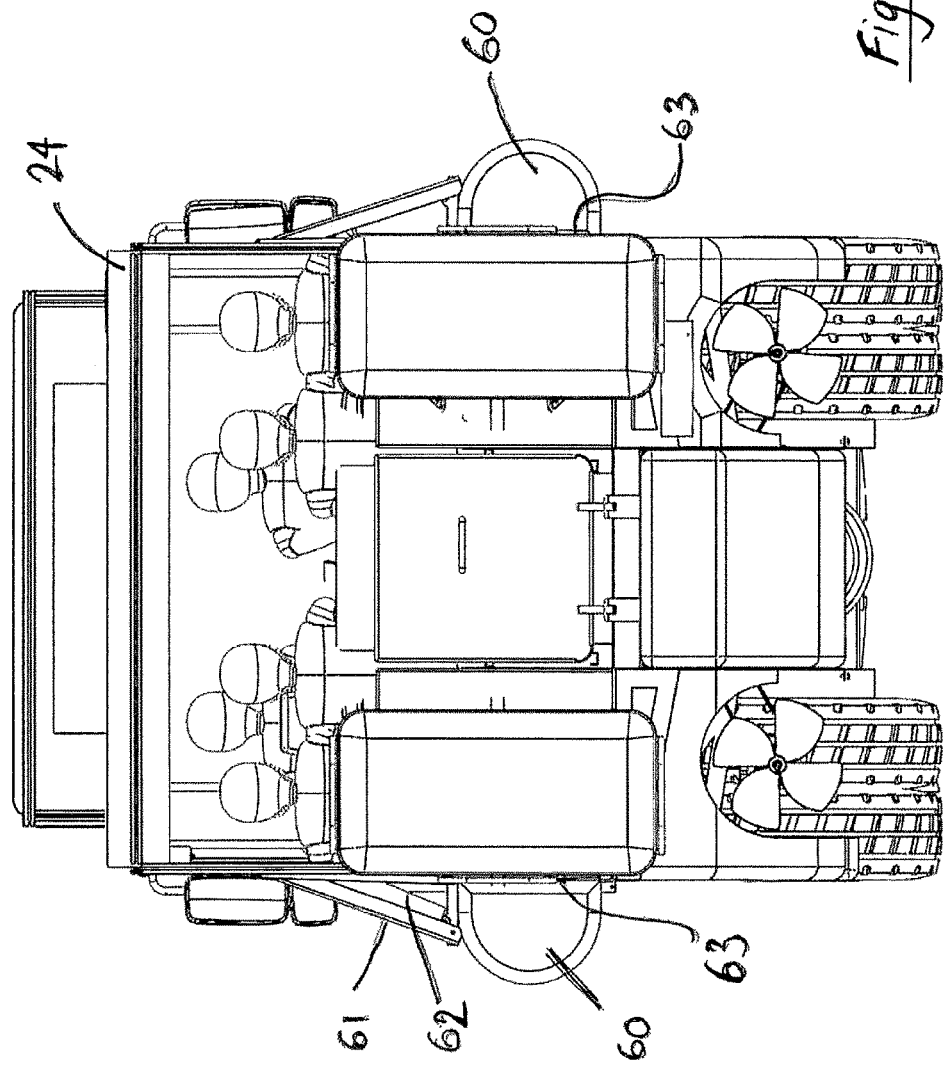
Figure 9A:
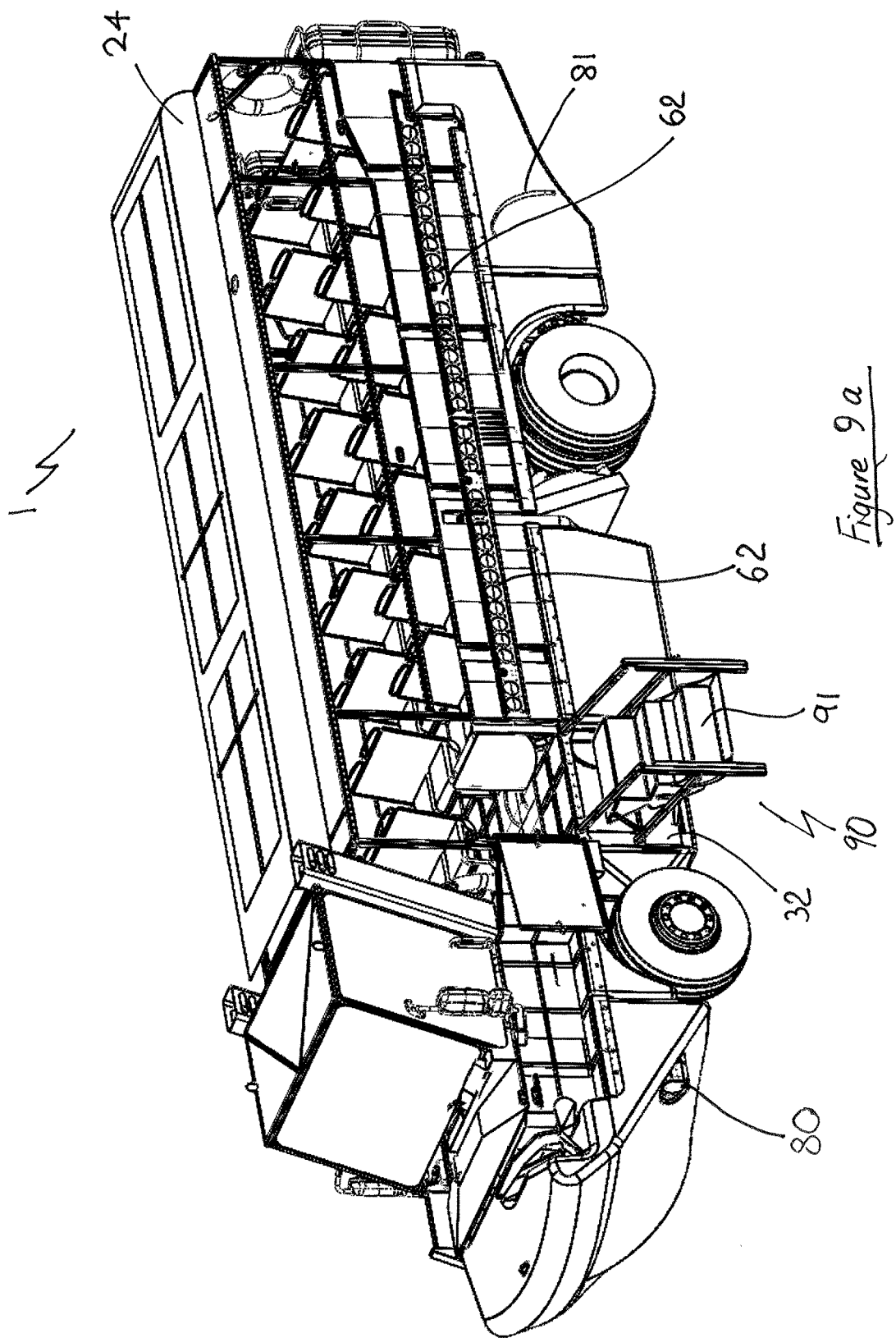
FIG. 9a is a schematic perspective illustration of an amphibious vehicle in accordance with the invention showing a mounting rail for attachment of manually deployable sponsons.

As shown in FIGS. 8a and 8b, the buoyancy modules located on the amphibious vehicle in a manner such that they do protrude outwardly beyond the side edges of the vehicle and therefore do not increase the effective width of the vehicle. In this way, regulations concerning the width of road going vehicles can be met. In other words, the widthwise footprint of the vehicle is not increased by the presence of the buoyancy modules.

The arrangement of the present invention whereby buoyancy modules are installed externally of the inner hull and which define the shape of outer hull provides a number of advantages over the traditional method of internal installation of foam within the vehicle hull.

One advantage is that the buoyancy modules can readily be removed by service technicians to facilitate any required or scheduled inspection of the hull and/or the buoyancy modules themselves. Upon removal of the buoyancy modules, the exterior of the primary hull and its associated structural ribs are fully exposed which facilitates inspection by a simple walk around on land.

Furthermore, when the buoyancy modules are in place on the amphibious vehicle, a walk around visual inspection can be performed at any time by the operator, management, customers and inspection officers in order to insure the integrity of the buoyancy system with any missing or damaged modules being self evident during such an inspection.

Furthermore, as the buoyancy modules are externally located in use, fewer and/or, more appropriately sized modules can be employed to allow for easy removal, handling, and inspection.

Still furthermore, annual recertification of the foam of the buoyancy modules would only require involve a visual inspection of the outer protective coating and weight assessment to verify buoyancy capacity.

In addition, freight-ready modules can be pre-certified from the manufacturer for delivered directly to the destination for installation on the amphibious vehicle thereby saving time and money.

Furthermore, modules can be repaired to full compliance quickly in the field by nontechnical staff. If damage to a module necessitates replacement of the module, replacement can be performed quickly due to the consistency and interchangeability of the modules. Conveniently also, the buoyancy modules can be removed without the requirement for vehicle jacking or lifting.

The design and arrangement of the buoyancy modules enables the amphibious vehicle to maintain its trim level when in a damaged condition due to ability of the buoyancy modules to retain their buoyancy if penetrated. Should the primary hull sustain damage, the retained buoyancy of the surrounding buoyancy modules would maintain proper stability and trim of the vessel. This is especially important in emergency egress conditions that could compromise safety due to excessive inclining of the vessel under damage condition scenarios in a conventional compartmented hull design.

Still furthermore, the visual appearance of an amphibious vehicle in accordance with the invention is distinct and so readily differentiates the amphibious vehicle of the present invention from other amphibious vehicles of the type which continue to struggle with safety and reliability. The visible exterior of the hull being formed from visible buoyancy modules creates a positive association with safety in the minds of customers and passenger.

Still furthermore, by locating the buoyancy modules externally of the inner hull, exposure of the foam to fire, heat, oil and fuel is obviated.

In addition, the materials and construction of the buoyancy modules provide long life and durability, with the materials of the outer protective coatings being capable of extending the life of the parts beyond fifteen years.

Advantageously also, repairs to the (primary) hull will be significantly easier to perform in the field due to the improved access with the buoyancy modules removed. Most compartments of the hull with restricted access will be eliminated.

Furthermore, the cost to produce the primary hull form is significantly reduced due to the ease of manufacturing a simplified design with straight plate and good access for welding (where the hull is formed from metal, e.g. steel or aluminium) with complex shapes and/or forms being designed into the buoyancy modules, with the foam materials being employed being well suited for designing intricate hull forms following proven guidelines.

Advantageously, should hull modifications be required in the future, these can be readily effected with buoyancy modules, if required, to fine tune buoyancy/trim requirements. Such modifications may be required when weight changes occur due to modification of components, relocation of tanks, etc. Modifications to steel hulls (e.g. the primary hull) can be much more difficult to perform in the field without jigs and specialized expertise to insure the continuity of the operating fleet.

Furthermore, the amphibious vehicle in accordance with the present invention provides an overall weight reduction in comparison to traditional steel hulled amphibious vehicles which in turn enables the 110% buoyancy requirement from the UK to be met and/or exceeded.

It is also anticipated that Insurance premiums for amphibious vehicles in accordance with the invention will be lower than known amphibious vehicles used in the sightseeing industry.

With reference to FIGS. 4, 8a and 8b, in one embodiment the amphibious vehicle further comprises one or more automatically deployable and retractable sponsons 60, the sponsons 60 being located proximate a roof 24 of the amphibious vehicle when in a retracted configuration (FIG. 4), and being movable (FIG. 8a) towards a deployed configuration to locations adjacent the respective sides of the amphibious vehicle (FIG. 8b).

Each sponson is pivotally mounted to the primary hull of the amphibious vehicle by one or more arm members 61. Motion of each sponson is effected by one or more rams 62 (FIGS. 4 and 8a) which act on an arm member 61. Each sponson comprises a substantially planar surface 63 adapted to abut against a side surface of the amphibious vehicle when in a deployed configuration (FIG. 8b).

The rams may be hydraulic, pneumatic or electrically powered.

Control over the operation of the sponsons can be effected by the driver of vehicle while seated in the driver compartment. In this way, the need to have personnel manually affix and remove sponsons is mitigated. Furthermore, automatic (i.e. non-manual) lowering and raising of the sponsons can be effected while the amphibious vehicle is in motion.

Sponsons 60 preferably have substantially the same construction and materials as the buoyancy modules. In other words, sponsons 60 comprise a pliable closed cell foam 60a, preferably an expanded polyethylene foam, having an outer protective coating 60b of substantially rigid polyurea or polyethylene which encases said closed cell foam. In this way, the protective coating 60b directly protects the pliable closed cell foam from impact damage.

Figure 9B:
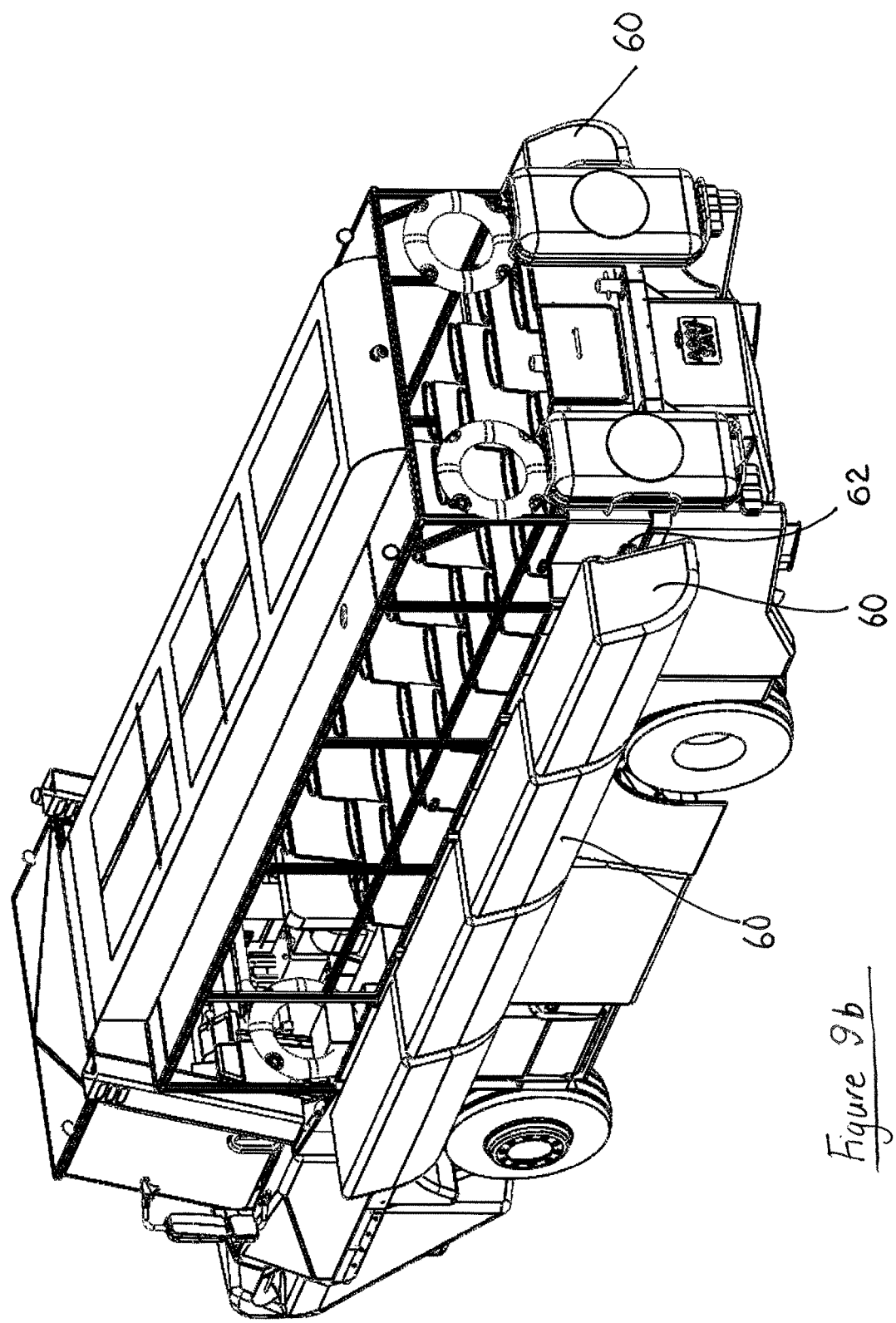
FIG. 9b is a schematic perspective illustration showing manually deployable sponsons mounted to an amphibious vehicle.

With reference to FIGS. 9a, 9b, 9c, in an alternative embodiment, the sponsons 60 may be manually deployable sponsons, being located or stored proximate to or on the roof 24 of the amphibious vehicle when in a non-deployed configuration, and manually located upon rails 62 (FIG. 9a) on the sides of the vehicle in a deployed configuration (FIG. 9b).

With reference to FIG. 9c, rails 62 are affixed to the hull 20 of the vehicle. Each rail 62 is adapted to receive a complementary mounting bracket 63 provided on a sponson 60. In this way, sponsons 60 are slidably mountable with rails 62.

In a preferred arrangement as shown in FIG. 10, the shank of bolt or bolts 70 is extended through an aperture the mounting bracket and screw threadedly engages with a rigid member 60c located within the sponson. The rigid member preferably comprises a steel bar or member 60c that is integrally formed with the sponson. The steel bar or member 60c is located within the sponson 60 beneath or behind the protective coating of substantially rigid material 60b.

It will be appreciated that a mixture of automatically and manually deployable sponsons may be employed.

With reference to FIGS. 4 and 5, the water propulsion system of the amphibious vehicle comprises dual hydraulically powered pods 40, each pod 40 driving a propeller 41 via a shaft 41a. Each pod is located externally of the hull 20. Hydraulic power is provided to each pod 40 by one or more engine driven hydraulic pumps (not shown) located proximate the engine of the amphibious vehicle. In one embodiment, each pod is powered by a dedicated hydraulic pump.

Preferably, the hydraulic pumps are located ahead of the engine 14 (FIG. 1) at a position between the engine and the bow of the amphibious vehicle in use. In this way, the noise of the hydraulic system experienced by the amphibious vehicle's passengers is mitigated.

Conveniently, the pods 40 are in hydraulic communication with the or each respective hydraulic pump via hydraulic lines 43 (FIGS. 12a and 12b) which run between the pump(s) and the pods 40 substantially externally of the hull of the amphibious vehicle. The hydraulic lines may comprise flexible or rigid pipes.

The use of hydraulic pods 40 and associated hydraulic lines 43 obviates the need for exclusively mechanical linkage between the engine of the amphibious vehicle and the propellers 41. In this way, the requirement for a drive or prop shaft between the engine and the propeller, together with associated carrier bearings is obviated thereby saving weight and space.

In one embodiment, as shown in FIG. 4 the hydraulic pods 40 are mounted to the amphibious vehicle so that they are independently adjustable in pitch and yaw. In this way, primary steering of the amphibious vehicle when in the water is effected by adjusting the pitch and/or yaw of the respective hydraulic pods. In this way, the propeller 41 shaft angle can be optimised for various amphibious vehicle configurations, for example for the purpose of sea trials. In this way also, the alignment of the respective hydraulic pods 40 can be adjusted to optimise the speed of the amphibious vehicle while in the water and/or influence the turning characteristics to minimise rolling to the outside of a hard turn while in the water. Furthermore, the hydraulic pods may be set to a fixed, optimal position.

Each hydraulic pod is independently operable with variable rpm.

The independent operability of the pods 40 enables isolation of one pod from the other in the event of a failure thereby enabling the amphibious vehicle to return to shore or mooring in a 'limp mode'.

As can be seen in FIG. 8a the hydraulic pods are spaced apart towards opposing sides of the amphibious vehicle. In this way, and in conjunction with the independently operable nature of the respective hydraulic pods, steering control of the amphibious vehicle when in the water can be provided by said hydraulic pods. Furthermore, the individually controllable dual hydraulic propulsion system of the invention allows the amphibious vehicle to turn within its own length. This is especially important when performing a timely man overboard drill and is essential when operating in tight quarters and/or windy conditions. In addition, the requirement for a tiller (not shown) and associated control system is obviated, with an emergency tiller only required in the vent of loss of propulsion of one pod.

In addition, steering of the amphibious vehicle is particularly optimised in reverse motion thereby negating the need for a bow thruster during low speed and space restricted operation.

In one embodiment as shown in FIGS. 12a and 12b, primary steering control of the amphibious vehicle when in the water can be effected by rudders 44 located downstream of the respective hydraulic pods 40, and located within the ducts defined by the rear buoyancy modules. In this embodiment, the hydraulic pods are set at a fixed orientation.

Advantageously, the respective rudders 44 are linked together via rods 45 which interconnect via an intermediate link plate 46. Steering input through the link plate 46 deflects rods 45 such that the rudder 44 occupying the inside of a turn rotates through a greater angle than the rudder occupying the outside of the turn as shown in FIG. 12b. This arrangement obviates the problem of choking of the water flow through the duct at the outside of the turn, which would otherwise cause the loss of vehicle turning power created by the ensuing off-centre thrust.

As shown in FIGS. 4, 8a and 8b, each hydraulic pod 40 is located aft of a respective rear wheel at position that is substantially level with the said wheel. In this way, the respective propellers 41 are located lower in the water in use than traditional DUKW-based amphibious vehicles. In this way, cavitation and/or aeration at the propeller 41 due to air ingestion is minimised. In addition, operation of two propellers deeper in the water provides improved reverse propulsion.

Figure 11:
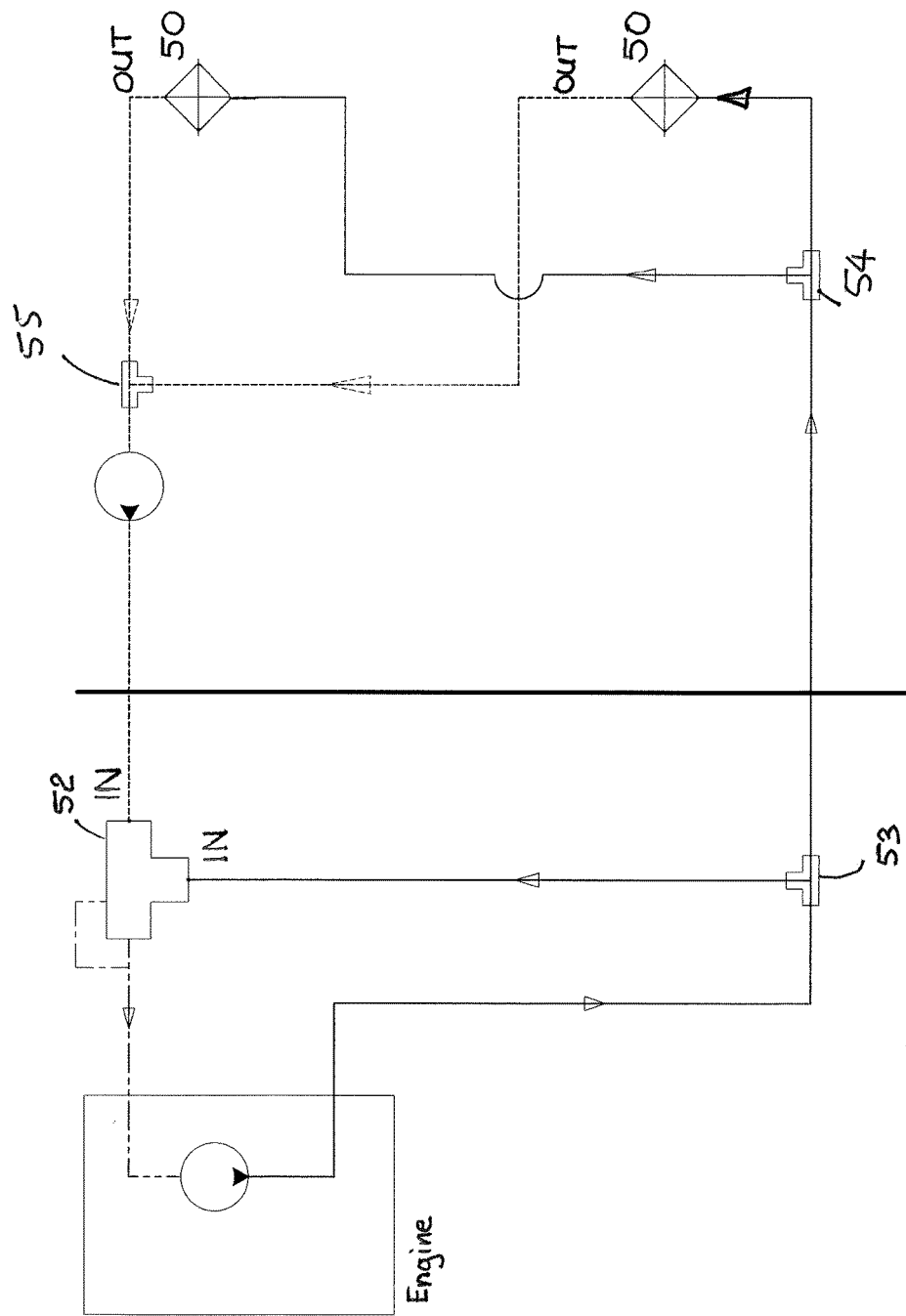
FIG. 11 shows a cooling circuit of the cooling system of the amphibious vehicle.

With reference to FIG. 3, the engine cooling system for the amphibious vehicle comprises one or more radiators 50 that are in fluid communication with the engine via one or more pipes (shown schematically on FIG. 11). The radiators 50 are each located externally of the hull 20 of the amphibious vehicle, at locations within the rear wheel wells of the amphibious vehicle. Each radiator comprises an hydraulically powered fan 51. Hydraulic power for the fans may be provided by the same hydraulic pumps which power the water propulsion system of the amphibious vehicle.

When the amphibious vehicle is in the water, the radiator(s) 50 is/are substantially immersed in the water. Thus the radiator(s) 50 is/are water cooled when the amphibious vehicle is in the water, and is/are air cooled when the amphibious vehicle is on land.

Preferably, two radiators are employed, one per wheel well. Preferably also, the radiators are located in the wheel wells in front of the wheels 18 in use (i.e. at a location between the wheels and the bow of the amphibious vehicle).

Fans 51 are adapted to be non operable when the amphibious vehicle is in the water. In this way, all available hydraulic power produced by the engine can instead be directed to the water propulsion system 40.

By locating the one or more radiators 50 within the rear wheel wells of the amphibious vehicle, i.e. spaced apart from the engine, the ambient air which cools the radiators while on land is hot heated by passing over the engine, exhaust, turbo, and transmission etc. of the vehicle. Instead, the air is predominantly 'clean' air. Thus the cooling efficiency of the radiator is increased. In addition, the heat dissipated along the piping between the engine and radiators 50 assists in cooling the engine coolant flowing in said pipes, which also run external to the hull, and which are also immersed in water when the amphibious vehicle is on the water.

Further advantageously, the external location of the radiators 50 within the wheel wells enables improved access for service, repair and replacement, and frees up space that would otherwise be taken up within the hull.

By locating the radiators externally of the hull, and within the wheel wells of the amphibious vehicle, the engine is more efficiently cooled that is the case with traditional DUKW-based amphibious vehicles. This is particularly the case when the traditional DUKW-based amphibious vehicle is in the water whereby load on the engine is at its greatest, and where air flow to the radiators is at its least. By having a cooling system comprising externally located radiators that are air cooled for land based operation and water cooled for water based operation, engine cooling is optimized for both situations. Furthermore, the radiators are flushed of debris each time the amphibious vehicle travels on the water.

FIG. 11 shows in schematic form a preferred cooling circuit of the cooling system of the amphibious vehicle.

As shown in FIG. 11, the radiators 50 are arranged in parallel (i.e. not sequential) configuration. The cooling system comprises a means to regulate the temperature of the cooled cooling fluid (i.e. coolant) returning to the engine of the amphibious vehicle, the means comprising a thermal mixing valve 52 in the cooling circuit to adjust the temperature of the cooled coolant, the thermal mixing valve 52 having an input to receive cooled coolant from the radiators 50, and an input to receive heated coolant from the engine so that the cooled coolant returning to the engine may be mixed with a portion of the engine heated coolant. In this way, the temperature of the coolant returning to the engine is regulated so as not to be too hot to cause engine overheating, and not too cold to cause the engine to run inefficiently and not meet emissions regulations.

Specifically, heated coolant exits the engine, and flows through a pipe to a T-piece 53 which allows the flow to split so that a portion of the heated coolant bypasses the radiators 50 and is fed the hot input of the thermal valve 52. The remainder of the heated coolant flows to a further T-piece 54 from where it is divided to the inlets of each radiator 50. The cooled coolant exiting the radiators 50 combine at a still further T-piece 55 before returning to the engine via the thermal mixing valve 52 and a single return pipe. Advantageously, such parallel arrangement of the radiators 50 means that the heat drop across both radiators 50 will be maximised, whereas if the coolant was routed first through one radiator then the other in sequence, the second radiator would only see a temperature drop based on the outlet temperature of the first radiator, and would therefore be less efficient.

The cooling circuit additionally comprises one or more shut off valves (not shown) to isolate one or both radiators 50 where necessary.

Further aspects and embodiments of the present disclosure are provided below.

In one aspect, A1, there is disclosed a water propulsion system for an amphibious vehicle comprising dual hydraulically powered pods, each pod comprising a hydraulic motor coupled to a propeller via a shaft, wherein hydraulic power is provided to each pod by one or more engine driven hydraulic pumps.

A2. The water propulsion system of A1, wherein the hydraulically powered pods are located externally of the hull.

A3. The water propulsion system of A1 or A2, wherein the one or more hydraulic pumps are located proximate the engine of the amphibious vehicle.

A4. The water propulsion system of any A1 to A3, wherein each pod is powered by a dedicated hydraulic pump.

A5. The water propulsion system according to any one of A1 to A4, wherein the or each hydraulic pump is/are located ahead of the engine at a position between the engine and the bow of the amphibious vehicle in use.

A6. The water propulsion system according to any one of A1 to A5, wherein each hydraulic pod is in hydraulic communication with the or each respective hydraulic pump via hydraulic lines located substantially externally of the hull of the amphibious vehicle.

A7. The water propulsion system according to any one of A1 to A6, wherein each hydraulic pod is independently adjustable in pitch and/or yaw.

A8. The water propulsion system according to any one of A1 to A7, wherein wherein steering control of the amphibious vehicle when in the water is provided by adjusting the pitch and/or yaw of the hydraulic pods.

A9. The water propulsion system according to any one of A1 to A7, wherein steering control of the amphibious vehicle when in the water is effected by rudders located downstream of the respective hydraulic pods.

A10. The water propulsion system according to A9, wherein the respective rudders are linked together via rods which connect to a link plate arranged so that steering inputs through the link plate deflects the rods such that the rudder occupying the inside of a turn rotates through a greater angle than the rudder occupying the outside of the turn.

A11. The water propulsion system according to any one of A1 to A10, wherein each hydraulic pod is independently operable with variable and reversible rpm.

In a further aspect, B1, there is disclosed a cooling system for an amphibious vehicle comprising one or more radiators in fluid communication with an engine of said amphibious vehicle, wherein the one or more radiators are located externally of the hull of said amphibious vehicle.

B2. The cooling system of B1, wherein the one or more radiators are substantially immersible in the water when the amphibious vehicle is in the water.

B3. The cooling system of B1 or B2, wherein the one or more radiators are located within a rear wheel well of the amphibious vehicle.

B4. The cooling system of B3, comprising two radiators, each radiator being located in a respective rear wheel well of the amphibious vehicle.

B5. The cooling system according to any of B1 to B4, wherein the or each radiator comprises a fan.

B6. The cooling system according to any of B1 to B5, wherein, wherein the or each fan is hydraulically powered.

B7. The cooling system according to any of B1 to B5, wherein the or each fan is electrically powered.

B8. The cooling system according to any of B1 to B5, wherein the or each fan is mechanically driven.

B9. The cooling system according to any of B1 to B8, wherein the or each fan is/are controllable to be non operable when the amphibious vehicle is in the water.

B10. The cooling system according to any of B1 to B9, wherein the cooling system comprises a cooling circuit having a means to regulate the temperature of cooled cooling fluid returning to the engine of the amphibious vehicle, the means comprising a thermal mixing valve in a cooling circuit adapted to adjust the temperature of the cooled coolant, the thermal mixing valve having an input from the cooled coolant from the radiators, and an input from the engine, wherein the cooled coolant returning to the engine is mixed with a portion of the engine heated coolant.

The invention claimed is:
1. An amphibious vehicle comprising:
a drive train;
a plurality of ground engaging wheels;
a cooling system;
a water propulsion system; and
a hull which defines a passenger compartment;
wherein the form/shape of the hull below the waterline is substantially defined by a plurality of buoyancy modules that are demountably mountable to the amphibious vehicle, wherein the buoyancy modules have an outer protective coating of substantially rigid material.

2. An amphibious vehicle as claimed in claim 1, wherein the substantially rigid material comprises polyurea or polyethylene.

3. An amphibious vehicle as claimed in claim 2, wherein the substantially rigid material comprises polyurea or polyethylene foam.

4. An amphibious vehicle comprising:
a drive train;
a plurality of ground engaging wheels;
a cooling system;
a water propulsion system; and
a hull which defines a passenger compartment;
wherein the form/shape of the hull below the waterline is substantially defined by a plurality of buoyancy modules that are demountably mountable to the amphibious vehicle further comprising one or more deployable sponsons wherein the one or more sponsons is/are manually mountable in their deployed configuration to sponson mounting means provided on the sides of the amphibious vehicle, the mounting means comprising one or more rails onto which the one or more sponsons are releasably engagable.

5. An amphibious vehicle having a roof and respective sides comprising:
a drive train;
a plurality of ground engaging wheels;
a cooling system;
a water propulsion system; and
a hull which defines a passenger compartment wherein the form/shape of the hull below the waterline is substantially defined by a plurality of buoyancy modules that are demountably mountable to the amphibious vehicle further comprising one or more deployable sponsons, wherein the or each sponson is an automatically deployable and retractable sponson being located proximate the roof of the amphibious vehicle when in a retracted configuration, and being movable in a deployed configuration to a location(s) adjacent the respective sides of the amphibious vehicle.

6. An amphibious vehicle as claimed in claim 5, wherein the or each automatically deployable sponson is pivotally mounted to the hull of the amphibious vehicle by one or more arm members and is movable by means of one or more rams, the or each ram being operable on an arm member to which the or each sponson is attached.

7. An amphibious vehicle as claimed in claim 5, wherein the one or more rams are hydraulic or pneumatic or electrically powered.

8. An amphibious vehicle as claimed in claim 5, wherein the or-each automatically deployable sponson comprises a substantially planar surface adapted to abut against a side surface of the amphibious vehicle when in a deployed configuration.

9. An amphibious vehicle comprising:
a drive train;
a plurality of ground engaging wheels;
a cooling system;
a water propulsion system; and
a hull which defines a passenger compartment;
wherein the form/shape of the hull below the waterline is substantially defined by a plurality of buoyancy modules that are demountably mountable to the amphibious vehicle, wherein the water propulsion system comprises dual hydraulically powered pods, each pod comprising a hydraulic motor coupled to a propeller via a shaft, wherein hydraulic power is provided to each pod by one or more engine driven hydraulic pumps.

10. An amphibious vehicle as claimed in claim 9, wherein the hydraulically powered pods are located externally of the hull.

11. An amphibious vehicle as claimed in claim 9, wherein the drivetrain comprises an engine and wherein the one or more hydraulic pumps are located proximate the engine of the amphibious vehicle.

12. An amphibious vehicle as claimed in claim 9, wherein each pod is powered by a dedicated hydraulic pump.

13. An amphibious vehicle as claimed in claim 9, wherein the drivetrain comprises an engine, wherein one or more buoyancy modules defines a bow of the amphibious vehicle, and wherein the or each hydraulic pump is/are located ahead of the engine at a position between the engine and the bow of the amphibious vehicle in use.

14. An amphibious vehicle as claimed in claim 9, wherein each hydraulic pod is in hydraulic communication with the or each respective hydraulic pump via hydraulic lines located substantially externally of the hull of the amphibious vehicle.

15. An amphibious vehicle as claimed in claim 9, wherein each hydraulic pod is independently adjustable in pitch and/or yaw.

16. An amphibious vehicle as claimed in claim 15, wherein steering control of the amphibious vehicle when in the water is provided by adjusting the pitch and/or yaw of the hydraulic pods.

17. An amphibious vehicle as claimed in claim 15, wherein steering control of the amphibious vehicle when in the water is effected by rudders located downstream of the respective hydraulic pods.

18. An amphibious vehicle as claimed in claim 17, wherein the respective rudders are linked together via rods which connect to a link plate arranged so that steering inputs through the link plate deflects the rods such that the rudder occupying the inside of a turn rotates through a greater angle than the rudder occupying the outside of the turn.

19. An amphibious vehicle as claimed in claim 9, wherein each hydraulic pod is independently operable with variable and reversible rpm.

20. An amphibious vehicle as claimed in claim 9, wherein each hydraulic pod is located aft of a respective rear wheel at position that is substantially level with said wheel.

21. An amphibious vehicle comprising:
a drive train;
a plurality of ground engaging wheels;
a cooling system;
a water propulsion system; and
a hull which defines a passenger compartment;
wherein the form/shape of the hull below the waterline is substantially defined by a plurality of buoyancy modules that are demountably mountable to the amphibious vehicle, wherein the cooling system comprises one or more radiators in fluid communication with the engine, wherein the one or more radiators are located externally of the hull of the amphibious vehicle.

22. An amphibious vehicle as claimed in claim 21, wherein the one or more radiators are substantially immersible in the water when the amphibious vehicle is in the water.

23. An amphibious vehicle as claimed in claim 21, wherein the one or more radiators are located within a rear wheel well of the amphibious vehicle.

24. An amphibious vehicle as claimed in claim 23, wherein there are provided two radiators, each radiator being located in a respective rear wheel well of the amphibious vehicle.

25. An amphibious vehicle as claimed in claim 21, wherein the or each radiator comprises a fan.

26. An amphibious vehicle as claimed in claim 25, wherein the or each fan is hydraulically powered.

27. An amphibious vehicle as claimed in claim 25, wherein the or each fan is electrically powered.

28. An amphibious vehicle as claimed in claim 25, wherein the or each fan is mechanically driven.

29. An amphibious vehicle as claimed in claim 25, wherein the or each fan is/ are controllable to be non operable when the amphibious vehicle is in the water.

30. An amphibious vehicle as claimed in claim 21, wherein the drivetrain comprises an engine and wherein the cooling system comprises a cooling circuit having a means to regulate the temperature of cooled cooling fluid returning to the engine of the amphibious vehicle, the means comprising a thermal mixing valve in a cooling circuit adapted to adjust the temperature of the cooled coolant, the thermal mixing valve having an input from the cooled coolant from the radiators, and an input from the engine, wherein the cooled coolant returning to the engine is mixed with a portion of the engine heated coolant.

* * * * *